United States Patent
Heo et al.

(10) Patent No.: US 9,568,790 B2
(45) Date of Patent: Feb. 14, 2017

(54) LIQUID CRYSTAL DISPLAY HAVING CONTACT HOLES ADJACENTLY DISPOSED IN THIN FILM TRANSISTOR FORMING REGION

(71) Applicant: Samsung Display Co., Ltd., Yongin, Gyeonggi-Do (KR)

(72) Inventors: Yun Heo, Gunpo-si (KR); Bong-Jun Lee, Seoul (KR); Dong Wuuk Seo, Asan-si (KR); Jong Woong Chang, Asan-si (KR)

(73) Assignee: Samsung Display Co., Ltd. (KR)

( * ) Notice: Subject to any disclaimer, the term of this patent is extended or adjusted under 35 U.S.C. 154(b) by 64 days.

(21) Appl. No.: 14/476,570

(22) Filed: Sep. 3, 2014

(65) Prior Publication Data

US 2015/0268525 A1    Sep. 24, 2015

(30) Foreign Application Priority Data

Mar. 19, 2014   (KR) ........................ 10-2014-0032370

(51) Int. Cl.
| | | |
|---|---|---|
| *G02F 1/136* | (2006.01) | |
| *G02F 1/1362* | (2006.01) | |
| *G02F 1/1337* | (2006.01) | |

(52) U.S. Cl.
CPC ... *G02F 1/136227* (2013.01); *G02F 1/133707* (2013.01); *G02F 2201/40* (2013.01)

(58) Field of Classification Search
CPC .................... G02F 1/136227; G02F 1/133512; G02F 1/3394; G02F 1/136277; G02F 1/136286
See application file for complete search history.

(56) References Cited

U.S. PATENT DOCUMENTS

| | | | |
|---|---|---|---|
| 6,998,283 B2 | 2/2006 | Kim et al. | |
| 7,800,704 B2 | 9/2010 | Lin et al. | |
| 8,357,936 B2 | 1/2013 | Choi et al. | |
| 2006/0146247 A1* | 7/2006 | Kim | G02F 1/134363 349/141 |
| 2007/0152220 A1* | 7/2007 | Kwack | G02F 1/1362 257/59 |

(Continued)

FOREIGN PATENT DOCUMENTS

| | | |
|---|---|---|
| JP | 2002-182236 | 6/2002 |
| KR | 1020130033827 A | 4/2013 |
| KR | 101319977 B1 | 10/2013 |

*Primary Examiner* — Tracie Y Green
(74) *Attorney, Agent, or Firm* — Innovation Counsel LLP (57) ABSTRACT

A liquid crystal display includes: a first substrate; a gate line and a common voltage line that are on the first substrate; a gate insulating layer on the gate line and the common voltage line; a semiconductor layer on the gate insulating layer; a data line and a drain electrode that are on the semiconductor layer; a pixel electrode on the data line and the drain electrode; a passivation layer on the pixel electrode; a common electrode on the passivation layer; a second substrate; and a liquid crystal layer interposed between the first and second substrates. The pixel electrode contacts the drain electrode via a first contact hole, the common electrode contacts the common voltage line via a second contact hole in the gate insulating layer and the passivation layer, and the first and second contact holes are adjacently disposed in a thin film transistor forming region.

16 Claims, 6 Drawing Sheets

(56) References Cited

U.S. PATENT DOCUMENTS

| | | | |
|---|---|---|---|
| 2008/0018843 A1* | 1/2008 | Park | G02F 1/1339 349/139 |
| 2008/0284967 A1* | 11/2008 | Oh | G02F 1/134363 349/144 |
| 2011/0013106 A1* | 1/2011 | Liu | G02F 1/136286 349/46 |
| 2011/0085105 A1* | 4/2011 | Park | G02F 1/1333 349/54 |
| 2012/0169955 A1* | 7/2012 | Kim | G02F 1/1337 349/41 |
| 2012/0206683 A1 | 8/2012 | Zhang | |
| 2013/0237052 A1* | 9/2013 | Kwon | H01L 27/127 438/625 |
| 2014/0159033 A1* | 6/2014 | Jeong | H01L 29/66969 257/43 |

\* cited by examiner

LIQUID CRYSTAL DISPLAY HAVING CONTACT HOLES ADJACENTLY DISPOSED IN THIN FILM TRANSISTOR FORMING REGION

CROSS-REFERENCE TO RELATED APPLICATION

This application claims priority to and the benefit of Korean Patent Application No. 10-2014-0032370 filed in the Korean Intellectual Property Office on Mar. 19, 2014, the entire contents of which are incorporated herein by reference.

BACKGROUND (a) Field

The present application relates to a liquid crystal display.

(b) Description of the Related Art

As one of the most widely used flat panel displays (FPDs), a liquid crystal display (LCD) is a display device realized by applying a voltage to electrodes and realigning liquid crystal molecules of a liquid crystal layer so as to adjust an amount of transmitted light.

The LCD has a merit in that it is easily manufactured to be thin, but has a demerit in that side visibility is poor compared with front visibility, and as a result various kinds of alignment methods and driving methods for liquid crystals have been developed.

In order to implement a wide viewing angle, the LCD in which a pixel electrode and a common electrode are formed in one substrate has received attention.

In such an LCD, at least one of the pixel electrode and the common electrode includes a plurality of cutouts, and a plurality of branch electrodes defined by the plurality of cutouts.

In this case, the pixel electrode and the common electrode are electrically insulated from each other, and are respectively connected to different wires to be applied with different voltages.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a liquid crystal display having an improved aperture ratio by forming a contact hole of a common voltage line and a common electrode in parallel with a contact hole of a drain electrode and a pixel electrode.

An exemplary embodiment provides a liquid crystal display including: a first substrate; a gate line and a common voltage line that are on the first substrate; a gate insulating layer on the gate line and the common voltage line; a semiconductor layer on the gate insulating layer; a data line and a drain electrode that are on the semiconductor layer; a pixel electrode on the data line and the drain electrode; a passivation layer on the pixel electrode; a common electrode on the passivation layer; a second substrate; and a liquid crystal layer interposed between the first and second substrates. The pixel electrode contacts the drain electrode via a first contact hole, the common electrode contacts the common voltage line via a second contact hole in the gate insulating layer and the passivation layer, and the first and second contact holes are adjacently disposed in a thin film transistor forming region.

The common voltage line may include a horizontal portion traversing a middle of the pixel electrode, and a vertical portion vertically extending along the data line.

One end of the vertical portion of the common voltage line may be provided with a common voltage line extension, the common voltage line extension may contact the common electrode, and the common voltage line extension may be disposed in the thin film transistor forming region.

The gate line may include a first gate electrode and a second gate electrode, and the semiconductor layer, a source electrode, and the drain electrode may be disposed on the first gate electrode.

A column spacer may be provided between the first and second substrates, and the column spacer may be disposed on the second gate electrode.

The second gate electrode may not be provided in a region where the common voltage line extension is disposed, and the common voltage line extension and the first gate electrode may be adjacently disposed in an extending direction of the gate line.

An island-shaped gate electrode separated from the gate line may be provided under the common voltage line extension.

A vertical portion of the common voltage line and a common voltage line extension may be in only one of three adjacent pixels.

The data line may be provided with a first bent portion and a second bent portion, the first bent portion may be bent to form an angle of about 6° to 8° with a vertical reference line perpendicular to an extending direction of the gate line, and the second bent portion disposed in a middle of a pixel area may be further bent to form an angle of about 7° to 15° with the first bent portion.

The pixel electrode may have a planar shape like a plate.

The common electrode may have a plurality of cutouts, and may include a plurality of branch electrodes defined by the plurality of cutouts.

The passivation layer may be disposed between the pixel electrode and the data line and drain electrode, and the passivation layer may include the first contact hole extending to the drain electrode.

The first contact hole in the passivation layer and the second contact hole through which the common electrode and the common voltage line extension contact each other may be adjacently disposed in the thin film transistor forming region.

A black matrix may be at an inner side of the second substrate.

The black matrix may be a lattice that covers the gate line, a gate electrode, and the data line, and has the same shape in the three adjacent pixels.

The black matrix may not be provided with an extension protruded toward a pixel electrode region.

The gate line and the common voltage line may be formed by the same process, and may be formed of the same material.

The first contact hole may be provided closer to the data line, and the second contact hole may be provided further away from the data line.

As described above, one embodiment provides a liquid crystal display having an improved aperture ratio by forming a contact hole of a common voltage line and a common electrode in parallel with a contact hole of a drain electrode and a pixel electrode such that a black matrix is not required to extend further so as to cover the contact hole of the common voltage line and the common electrode.

DETAILED DESCRIPTION OF THE EMBODIMENTS

The inventive concept will be described more fully hereinafter with reference to the accompanying drawings, in which exemplary embodiments are shown.

As those skilled in the art would realize, the described embodiments may be modified in various different ways, all without departing from the spirit or scope of the inventive concept.

In the drawings, the thickness of layers, films, panels, regions, etc. are exaggerated for clarity.

Like reference numerals designate like elements throughout the specification.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

A liquid crystal display according to an exemplary embodiment will now be described with reference to the drawings.

Figure 1:
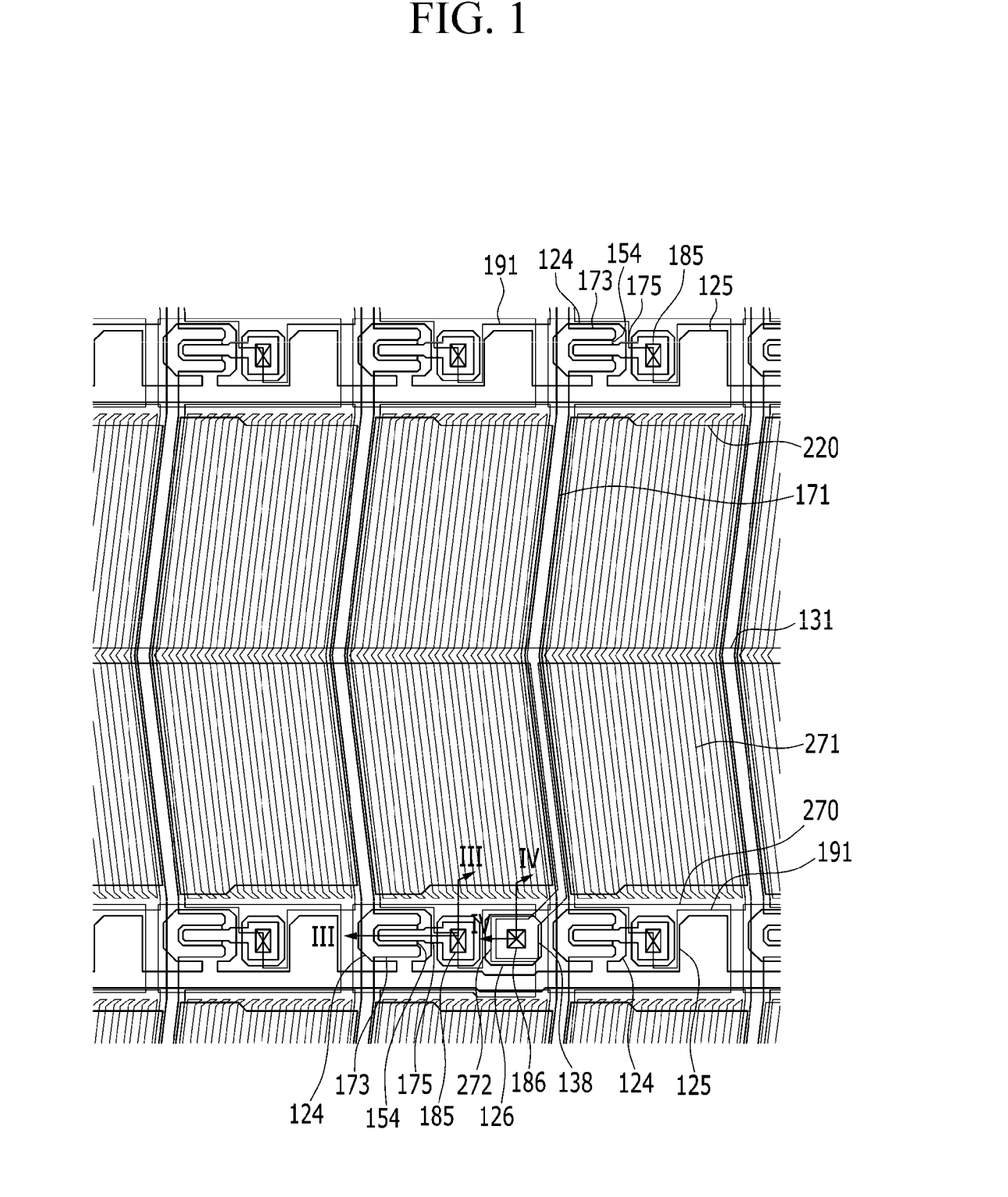
FIG. 1 is a layout view of a liquid crystal display according to an exemplary embodiment.
Figure 2:
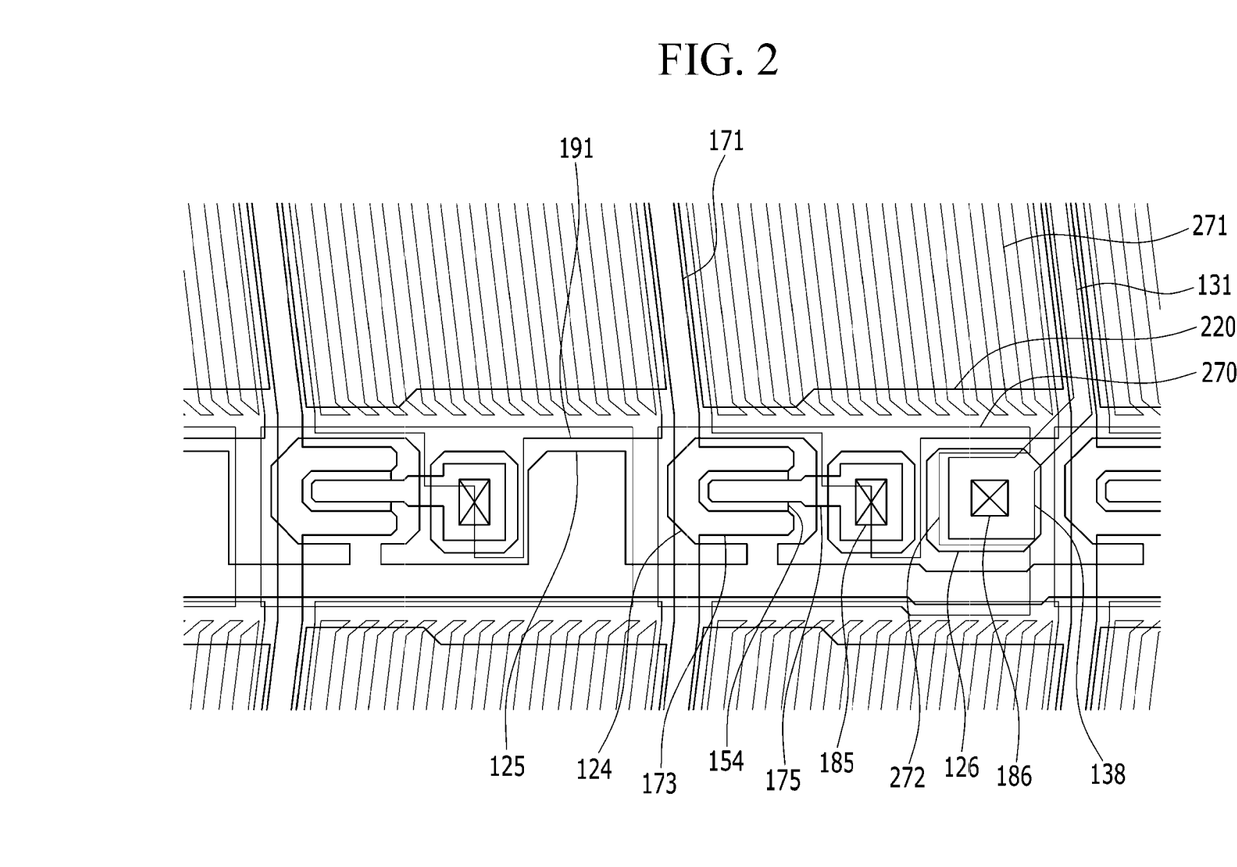
FIG. 2 is an enlarged view of a partial region of the liquid crystal display according to the exemplary embodiment illustrated in FIG. 1.

FIG. 1 is a layout view of a liquid crystal display according to an exemplary embodiment, and FIG. 2 is an enlarged view of a partial region of the liquid crystal display according to the exemplary embodiment illustrated in FIG. 1.

Figure 3:
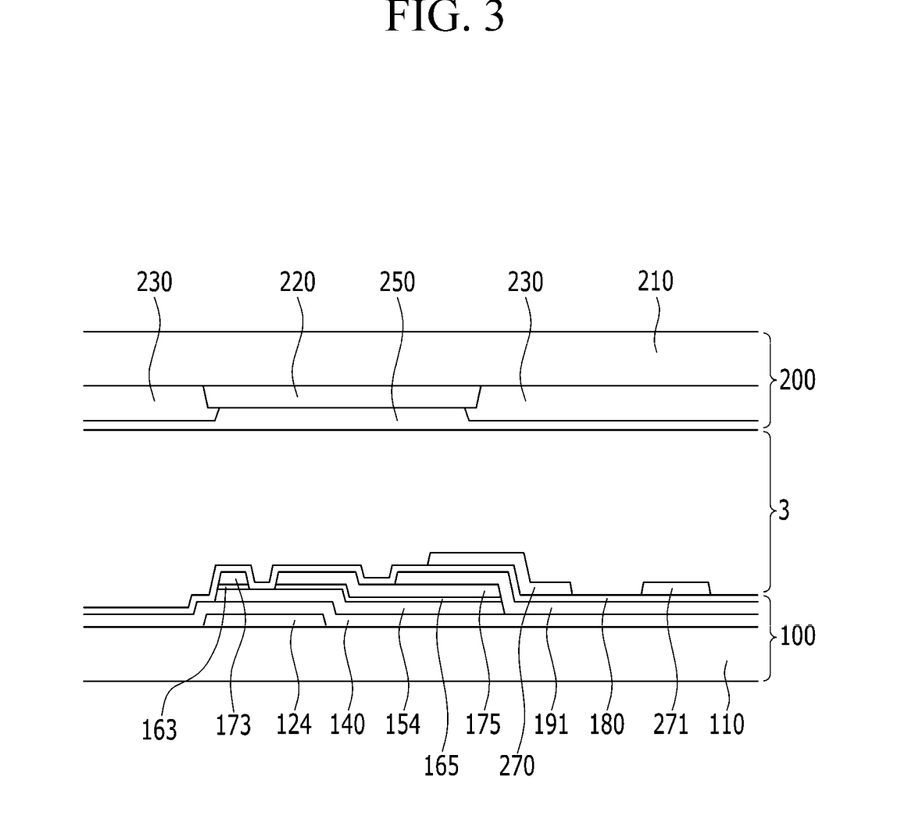
FIG. 3 is a cross-sectional view of the liquid crystal display according to the exemplary embodiment illustrated in FIG. 1, taken along the line III-III.
Figure 4:
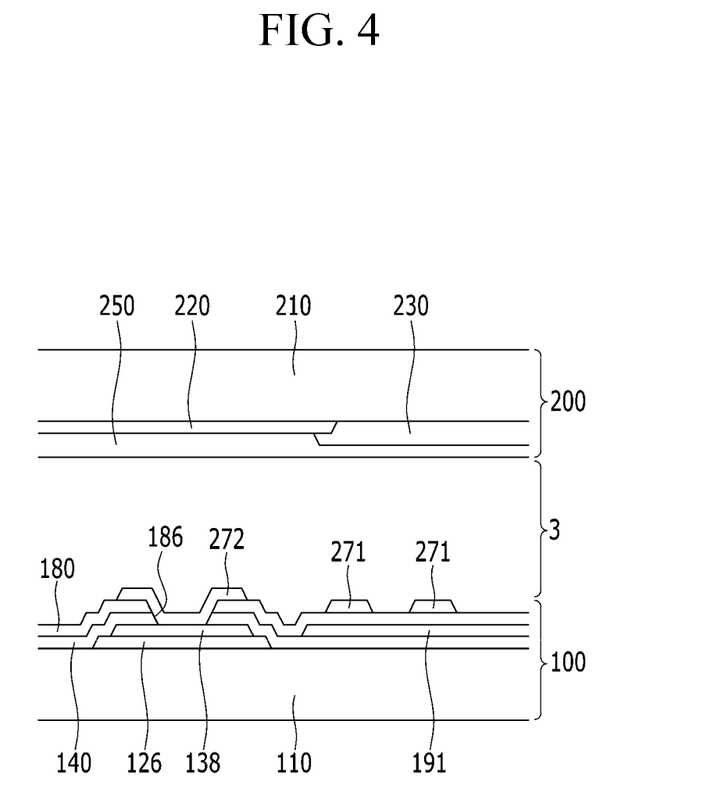
FIG. 4 is a cross-sectional view of the liquid crystal display according to the exemplary embodiment illustrated in FIG. 1, taken along the line IV-IV.

FIG. 3 is a cross-sectional view of the liquid crystal display according to the exemplary embodiment illustrated in FIG. 1, taken along the line III-III, and FIG. 4 is a cross-sectional view of the liquid crystal display according to the exemplary embodiment illustrated in FIG. 1, taken along the line IV-IV.

Referring to FIGS. 1 and 2, the liquid crystal display according to the exemplary embodiment includes a lower panel 100 and an upper panel 200 facing each other, and a liquid crystal layer 3 injected therebetween.

First, the lower panel 100 will be described.

A gate conductor including a gate line 121 and a common voltage line 131 is formed on an insulation substrate 110 formed of transparent glass or plastic.

The gate line 121 includes a first gate electrode 124, a second gate electrode 125, and a wide end portion (not shown) for connection with other layers or an external driving circuit.

Although details will be described later, a semiconductor layer, a source electrode, and a drain electrode are formed on the first gate electrode 124 to form a thin film transistor, and a column spacer is disposed on the second gate electrode 125.

The gate line 121 may be formed of an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), tantalum (Ta), and titanium (Ti).

However, the gate line 121 may have a multilayered structure including at least two conductive layers having different physical properties.

The common voltage line 131 transmits a constant common voltage, and includes an extension 138 for connection with a common electrode 270.

The common voltage line 131 contacts the common electrode 270 at the common voltage line extension 138, and the common electrode 270 is applied with a constant voltage from the common voltage line 131.

The common voltage line 131 may be in parallel with the gate line 121, and may be formed of the same material as the gate line 121.

In the exemplary embodiment, the common voltage line 131 traverses a middle of a pixel area, and is formed in parallel with the gate line 121.

Referring to FIG. 1, the common voltage line extension 138 may be formed in one of three adjacent pixel electrodes.

In addition, the common voltage line extension 138 is formed at a position in which the second gate electrode 125 was previously disposed.

Referring to FIGS. 1 and 2, the second gate electrode 125 is connected to the gate line 121, and a column spacer will be disposed later on the second gate electrode 125.

However, referring to FIGS. 1 and 2, an island-shaped gate electrode 126, instead of the second gate electrode 125, is formed under the common voltage line extension 138.

The island-shaped gate electrode 126 is separated from the gate line 121 such that different voltages can respectively be applied to the common electrode 270 and the pixel electrode.

The common voltage line 131 and the common voltage line extension 138 are connected to each other by the common voltage line 131 that vertically extends, and a vertical portion of the common voltage line 131 extends between the adjacent pixels, that is, along a data line.

The vertical portion of the common voltage line 131 may also be formed in only one of the three adjacent pixels.

A gate insulating layer 140 formed of a silicon nitride ($SiN_x$), a silicon oxide ($SiO_x$), etc. is formed on the gate conductor 121, also called a gate line 121.

The gate insulating layer 140 may have a multilayered structure in which at least two insulating layers having different physical properties are included.

A semiconductor 154 formed of amorphous silicon or polysilicon is formed on the gate insulating layer 140.

The semiconductor 154 may include an oxide semiconductor.

Ohmic contacts 163 and 165 are formed on the semiconductor 154.

The ohmic contacts 163 and 165 may be formed of n+ hydrogenated amorphous silicon that is highly doped with n-type impurities such as phosphorus, or of a silicide.

The ohmic contacts 163 and 165 may be paired to be disposed on the semiconductor 154.

When the semiconductor 154 is an oxide semiconductor, the ohmic contacts 163 and 165 may be omitted.

A data line 171 including a source electrode 173 and a data conductor including a drain electrode 175 is formed on the ohmic contacts 163 and 165 and the gate insulating layer 140.

The data line 171 includes a wide end portion (now shown) for connection with other layers or an external driving circuit.

The data line 171 transmits a data signal, and mainly extends in a vertical direction to cross the gate line 121.

In this case, the data line 171 may have a first bent portion having a curved shape so as to obtain maximum transmittance of the liquid crystal display, and bent portions may contact each other in the middle of the pixel area to form a V shape.

A second bent portion that is bent to form a predetermined angle with the first bent portion may be further formed in the middle of the pixel area.

The first bent portion of the data line 171 may be curved to form an angle of about 7°, e.g., about 6° to 8°, with a vertical reference line y (a reference line extending in a y direction) that is perpendicular to an extending direction of the gate line 121 (an x direction).

The second bent portion disposed in the middle of the pixel area may be further curved to form an angle of about 7° to 15° with the first bent portion.

The source electrode 173 is a part of the data line 171, and is disposed on the same line as the data line 171.

The source electrode 173 has a shape in which the part of the data line 171 is bent in a "U" shape.

The drain electrode 175 has a rod shape that extends toward the bent portion with the "U" shape.

The gate electrode 124, the source electrode 173, and the drain electrode 175 form a thin film transistor (TFT) along with the semiconductor 154, and a channel of the TFT is formed in the semiconductor 154 between the source electrode 173 and the drain electrode 175.

The data line 171 and the drain electrode 175 may be formed of a refractory metal, such as molybdenum, chromium, tantalum, titanium, etc., or an alloy thereof, and may have a multilayered structure including a refractory metal layer (not shown) and a low resistance conductive layer (not shown).

Examples of the multilayered structure may include a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer.

However, the data line 171 and the drain electrode 175 may be formed of various metals or conductors in addition to the aforementioned metals.

A width of the data line 171 may be about 3.5 µm±0.75.

In one embodiment, a region in which the gate line 121, the gate electrode 124, the data line 171, and the TFT are formed is referred to as a thin film transistor forming region. The thin film transistor forming region refers to a region that is covered by the black matrix and thus is not exposed.

A pixel electrode 191 is formed directly on the drain electrode 175.

The pixel electrode 191 has a planar shape, which is a plate shape, and is disposed in one pixel area.

In one embodiment, a region formed with the pixel electrode 191 is referred to as a pixel electrode region.

The pixel electrode region refers to a region in which colors such as blue, red, green, etc. are actually displayed because it is not covered by the black matrix.

A passivation layer 180 is disposed on the data conductors 171, 173, and 175, the gate insulating layer 140, exposed portions of the semiconductor 154, and the pixel electrode 191.

However, in a liquid crystal display according to another exemplary embodiment, a passivation layer 180 may be disposed between the pixel electrode 191 and the data line 171, and the pixel electrode 191 may be connected to the drain electrode 175 through a contact hole 185 formed in the passivation layer 180.

Even in this case, the passivation layer 180 is further disposed on the pixel electrode 191 to electrically insulate the common electrode 270 from the pixel electrode 191.

The common electrode 270 is formed on the passivation layer 180.

Common electrodes 270 are connected to each other to be applied with a common voltage applying unit that is disposed outside of the display area.

The common electrode 270 has a common electrode extension 272 that is formed on the common voltage line extension 138.

Referring to FIGS. 1 and 4, the common electrode extension 272 is physically and electrically connected to the common voltage line 131 through a second contact hole 186 formed in the gate insulation layer 140 and the passivation layer 180, so as to be applied with the constant common voltage from the common voltage line 131.

The common electrode 270 includes a bent side substantially parallel to the first and second bent portions of the data line 171, and the common electrodes 270 disposed in adjacent pixels are connected to each other.

The common electrode 270 is provided with a plurality of second cutouts, and includes a plurality of second branch electrodes 271 that are defined by the plurality of second cutouts.

In one embodiment, a position where the pixel electrode 191 contacts the drain electrode 175 is referred to as a first contact hole 185, and a position where the common electrode 270 contacts the common voltage line 131 is referred to as a second contact hole 186.

The first and second contact holes 185, 186 are both disposed in the thin film transistor forming region.

The first and second contact holes 185, 186 are adjacently disposed in an extending direction of the gate line 121 (x direction).

The first and second contact holes 185, 186 are present on the same side based on the gate line 121.

Based on a crossing point of the data line 171 and the gate line 121, the first contact hole 185 is disposed closer thereto and the second contact hole 186 is disposed further away therefrom.

That is, contact between the drain electrode 175 and the pixel electrode 191 occurs at a position that is closer to the data line 171, and contact between the common electrode 270 and the common voltage line 131 occurs at a position that is further away from the data line 171.

However, both contacts occur in the thin film transistor forming region, and do not intrude on the pixel electrode region.

Though not illustrated, an alignment layer is applied on the common electrode 270 and the passivation layer 180, and the alignment layer may be a horizontal alignment layer that is rubbed in a predetermined direction.

However, according to a liquid crystal display according to another exemplary embodiment, an alignment layer includes a photoreactive material to be photo-aligned. The upper panel 200 will now be described.

A light blocking member 220, which is also called a black matrix 220, is formed on an insulation substrate 210.

A plurality of color filters 230 are formed on the substrate 210.

The color filters 230 may be disposed on the lower panel 100, and in this case, the light blocking member 220 may also be disposed on the lower panel 100.

In one embodiment, the black matrix 220 covers regions where the gate line 121 and the data line 171 are present, and does not cover the pixel electrode 191.

That is, the black matrix 220 does not intrude on a region where the pixel electrode 191 is present.

The black matrix 220 is formed only in the thin film transistor region.

An overcoat 250 is formed on the color filter 230 and the light blocking member 220.

The overcoat 250 may be omitted.

The alignment layer may be disposed on the overcoat 250.

The liquid crystal layer 3 includes a nematic liquid crystal material having positive dielectric anisotropy.

Liquid crystal molecules of the liquid crystal layer 3 are aligned such that their longer axes are arranged in a direction parallel to the display panels 100 and 200 and spirally twisted at 90° from a rubbing direction of the alignment layer of the lower panel 100 to the upper panel 200.

Though not illustrated, a column spacer may be provided between the upper and lower panels 200 and 100.

In this case, the column spacer may be disposed above the second gate electrode 125 of the lower panel 100.

A liquid crystal display according to a comparative example in accordance with one embodiment will now be described with reference to FIGS. 5 and 6.

Figure 5:
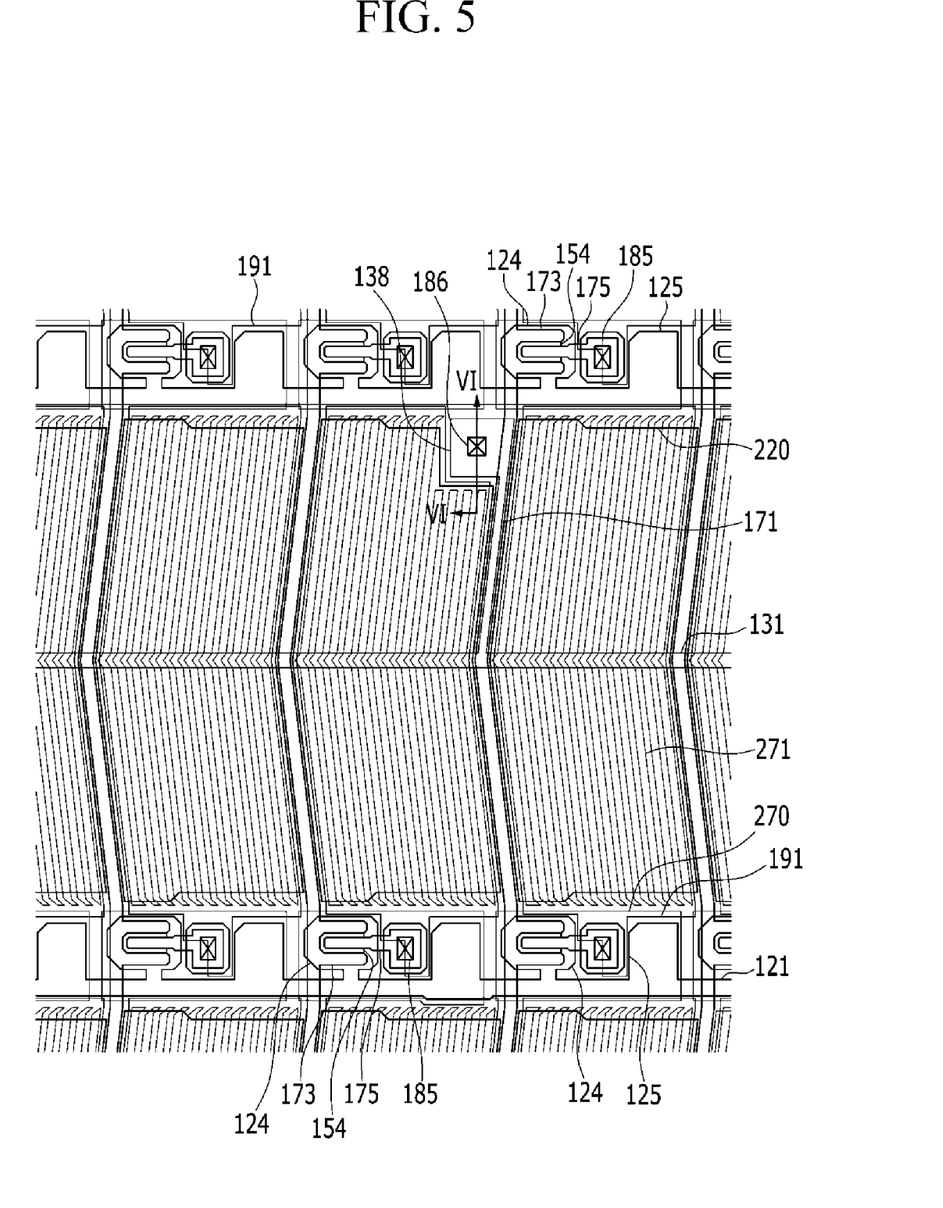
FIG. 5 is a layout view of a liquid crystal display according to a comparative example in accordance with one embodiment.
Figure 6:
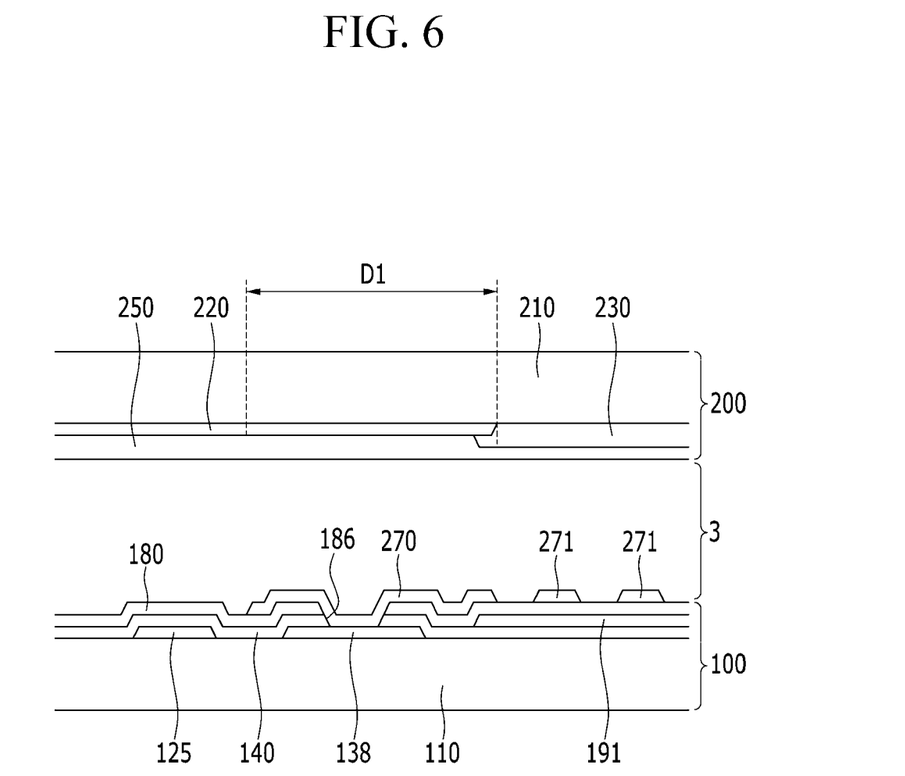
FIG. 6 is a cross-sectional view of the liquid crystal display according to the comparative example illustrated in FIG. 5, taken along the line VI-VI.

FIG. 5 is a layout view of a liquid crystal display according to a comparative example of one embodiment, and FIG. 6 is a cross-sectional view of the liquid crystal display according to the comparative example illustrated in FIG. 5, taken along the line VI-VI.

Referring to FIGS. 5 and 6, the liquid crystal display according to the comparative example is similar to the liquid crystal display according to the exemplary embodiment.

A detailed description of like constituent elements will be omitted.

However, referring to FIG. 5, the liquid crystal display according to the comparative example differs from the exemplary embodiment in that its contact position at which the common voltage line extension 138 of the common voltage line 131 contacts the common electrode 270.

Referring to FIG. 5, in the comparative example, the common voltage line extension 138 is formed in the pixel electrode region where the pixel electrode 191 is disposed.

That is, in the exemplary embodiment, the common voltage line extension 138 is disposed adjacent to the gate line 121 (in the thin film transistor forming region), but in the comparative example of one embodiment, the common voltage line extension 138 is disposed in the pixel electrode region.

In the liquid crystal display according to the exemplary embodiment, the black matrix 220 is formed not to extend toward the pixel electrode region but to cover the gate line 121, the gate electrodes 124 and 125, and the data line 171.

However, as shown in FIG. 5, in the liquid crystal display according to the comparative example of one embodiment, the black matrix 220 extends toward the pixel electrode region so as to cover the common voltage line extension 138.

That is, an area of the region covered by the black matrix 220 is larger than that of the exemplary embodiment.

FIG. 6 is a cross-sectional view of the liquid crystal display according to the comparative example illustrated in FIG. 5, taken along the line VI-VI.

Referring to FIG. 6, the black matrix 220 extends further by D1 so as to cover the common voltage line extension 138.

When the common voltage line extension 138 is not covered by the black matrix 220, the common voltage line extension 138 is recognized as a lattice stain.

Thus, in the liquid crystal display according to the comparative example of one embodiment, the black matrix 220 extends further so as to cover the common voltage line extension 138.

Generally, the common voltage line extension 138 is formed in one of the three adjacent pixels.

Thus, in the pixel formed with the common voltage line extension 138, the black matrix 220 extends further by D1, as shown in FIG. 6.

In addition, in order for the common electrode 270 and the common voltage line 131 to contact each other, the pixel electrode 191 also has a shape that is partially dented inwardly.

That is, an area of the pixel electrode 191 of the pixel where the common electrode 270 contacts the common voltage line 131 becomes smaller than those of the adjacent pixels.

However, as described above, in the liquid crystal display according to the exemplary embodiment, the common voltage line extension 138 is disposed in a region where the second gate electrode 125 is disposed.

That is, since the common voltage line extension 138 is disposed in the region covered by the black matrix 220, the black matrix 220 is not required to extend further so as to cover the common voltage line extension 138.

Thus, an aperture ratio is increased further than that of the comparative example of one embodiment.

In addition, the three adjacent pixels generally exhibit colors of red, green, and blue, and the common voltage line extension 138 is formed in the blue pixel among them.

This is because the blue pixel is least affected by formation of the common voltage line extension 138.

Thus, in the comparative example of one embodiment, as the common voltage line extension 138 is formed in the blue pixel and the blue pixel region is covered by the black matrix 220, an aperture ratio of red, green, and blue does not satisfy 1:1:1.

However, in the liquid crystal display according to one embodiment, since the common voltage line extension 138 is formed in the region covered by the existing black matrix 220, instead of being formed in the pixel area, the black matrix 220 is not required to extend further.

Accordingly, the aperture ratio of red, green, and blue satisfies 1:1:1.

In addition, in the case of the liquid crystal display according to the comparative example of one embodiment, there is a limitation that the common voltage line extension 138 should be formed in the blue pixel, but in the liquid crystal display according to the exemplary embodiment, the common voltage line extension 138 can be formed in any pixel among red, blue, and green pixels.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of Symbols>

| | |
|---|---|
| 110, 210: insulation substrate | 3: liquid crystal layer |
| 121: gate line | 124: first gate electrode |
| 125: second gate electrode | 126: island-shaped gate electrode |
| 131: common voltage line | 138: common voltage line extension |
| 140: gate insulating layer | 220: black matrix |
| 154: semiconductor | 163, 165: ohmic contact |
| 171: data line | 173: source electrode |
| 175: drain electrode | 180: passivation layer |
| 191: pixel electrode | 270: common electrode |

What is claimed is:

1. A liquid crystal display comprising:
a first substrate;
a gate line and a common voltage line that are on the first substrate;
a gate insulating layer on the gate line and the common voltage line;
a semiconductor layer on the gate insulating layer;
a data line and a drain electrode that are on the semiconductor layer;
a pixel electrode on the data line and the drain electrode;
a passivation layer on the pixel electrode, the pixel electrode being between the first substrate and the passivation layer;
a common electrode on the passivation layer;
a second substrate; and
a liquid crystal layer interposed between the first and second substrates, wherein
the pixel electrode contacts the drain electrode via a first contact hole,
the common electrode contacts the common voltage line via a second contact hole in the gate insulating layer and the passivation layer, and
the first and second contact holes are adjacently disposed in a thin film transistor forming region, wherein the common voltage line includes a horizontal portion traversing a middle of the pixel electrode, and a vertical portion vertically extending along the data line, one end of the vertical portion of the common voltage line is provided with a common voltage line extension, wherein the gate line includes a first gate electrode and a second gate electrode, the second gate electrode is not provided in a region where the common voltage line extension is disposed, and the common voltage line extension and the first gate electrode are adjacently disposed in an extending direction of the gate line.

2. The liquid crystal display of claim 1, wherein the common voltage line extension contacts the common electrode, and
the common voltage line extension is disposed in the thin film transistor forming region.

3. The liquid crystal display of claim 2, wherein the semiconductor layer, a source electrode, and the drain electrode are disposed on the first gate electrode.

4. The liquid crystal display of claim 3, wherein a column spacer is provided between the first and second substrates, and
the column spacer is disposed on the second gate electrode.

5. The liquid crystal display of claim 1, wherein an island-shaped gate electrode separated from the gate line is provided under the common voltage line extension.

6. The liquid crystal display of claim 1, wherein the vertical portion of the common voltage line and the common voltage line extension are in only one of three adjacent pixels.

7. The liquid crystal display of claim 1, wherein the data line is provided with a first bent portion and a second bent portion,
the first bent portion is bent to form an angle of about 6° to 8° with a vertical reference line perpendicular to an extending direction of the gate line, and
the second bent portion disposed in a middle of a pixel area is further bent to form an angle of about 7° to 15° with the first bent portion.

8. The liquid crystal display of claim 1, wherein the pixel electrode has a planar shape like a plate.

9. The liquid crystal display of claim 8, wherein the common electrode has a plurality of cutouts, and includes a plurality of branch electrodes defined by the plurality of cutouts.

10. The liquid crystal display of claim 1, wherein the passivation layer is further disposed between the pixel electrode and the data line and drain electrode, and the passivation layer comprise the first contact hole extending to the drain electrode.

11. The liquid crystal display of claim 10, wherein the first contact hole in the passivation layer and the second contact hole through which the common electrode and the common voltage line contact each other are adjacently disposed in the thin film transistor forming region.

12. The liquid crystal display of claim 6, wherein a black matrix is at an inner side of the second substrate.

13. The liquid crystal display of claim 12, wherein the black matrix is a lattice that covers the gate line, a gate electrode, and the data line, and has the same shape in the three adjacent pixels.

14. The liquid crystal display of claim 13, wherein the black matrix is not provided with an extension protruded toward a pixel electrode region.

15. The liquid crystal display of claim 1, wherein the gate line and the common voltage line are formed by the same process, and are formed of the same material.

16. The liquid crystal display of claim 1, wherein the first contact hole is provided closer to the data line, and
the second contact hole is provided further away from the data line.

* * * * *